May 9, 1967  J. WINTER  3,318,738
METHOD OF FABRICATING NON-EARING ALUMINUM
Filed Dec. 18, 1963  6 Sheets-Sheet 2

FABRICATION FLOW CHART (1) Cast and scalp
(2) Preheat treatment
(3) Transfer to hot rolling holding furnace
(4) Hot roll, reheating between each pass as follows:

| H.R. -450°F to 0.090 | H.R. -550°F to 0.090 | H.R. -650°F to 0.090 | H.R. -750°F to 0.090 | H.R.-850°F to 0.090 | H.R. -950°F to 0.090 |

Inter-Anneal (1)  950°F - 2 Hrs. / AC

| C.R. -50% to 0.045 | C.R. -50% to 0.045 | C.R. -50% to 0.045 | C.R. -50% to 0.045 | C.R. -50% to 0.045 | C.R. -50% to 0.045 |

Inter-Anneal (2)  650°F - 2 Hrs. / AC

| C.R. -55% to 0.020 | C.R. -55% to 0.020 | C.R. -55% to 0.020 | C.R. -55% to 0.020 | C.R. -55% to 0.020 | C.R. -55% to 0.020 |

Inter-Anneal (3)  650°F - 2 Hrs. / AC

| C.R. -50% to 0.010 | C.R. -50% to 0.010 | C.R. -50% to 0.010 | C.R. -50% to 0.010 | C.R. -50% to 0.010 | C.R. -50% to 0.010 |

Inter-Anneal (4)  650°F - 2 Hrs. / AC

FIG-2

INVENTOR.
JOSEPH WINTER
BY
Martin D. Wittstein
ATTORNEY

EARING BEHAVIOR AS A FUNCTION OF HOT ROLLING
TEMPERATURE AND SUBSEQUENT 950°F - 2 HR
ANNEAL - SUPERPURITY (99.99%) ALUMINUM

EARING BEHAVIOR AS A FUNCTION OF HOT ROLLING
TEMPERATURE AND SUBSEQUENT 950°F - 2 HR
ANNEAL - ALLOY 1100

EARING BEHAVIOR AS A FUNCTION OF HOT ROLLING
TEMPERATURE AND SUBSEQUENT 950°F - 2 HR
ANNEAL - ALLOY 3003

INVENTOR.
JOSEPH WINTER
BY
Martin D. Wittstein
ATTORNEY

EARING BEHAVIOR AS A FUNCTION OF HOT ROLLING TEMPERATURE AND SUBSEQUENT 950°F - 2 HR ANNEAL - ALLOY 5005

United States Patent Office 3,318,738
Patented May 9, 1967

3,318,738
METHOD OF FABRICATING NON-EARING ALUMINUM
Joseph Winter, New Haven, Conn., assignor to Olin Mathieson Chemical Corporation, a corporation of Virginia
Filed Dec. 18, 1963, Ser. No. 331,675
4 Claims. (Cl. 148—2)

This invention relates generally to improvements in sheet metal and sheet metal processing, and more particularly to features of sheet metal which improve its deep drawing behavior.

Deep drawing of flat sheet metal is a long established and well known method of producing cup-shaped articles from such flat sheets, the process sometimes known as "cupping." Depending upon the type of article desired, the cupping process may yield the finished article, at least as far as the basic shape is concerned, or only an intermediately shaped item from which other articles are fabricated through further processing of the basic cup, or through additional manufacturing in which the cup is merely a component of an assemblage. In any event, the formation of the cup is a critical step in any of the above processes; hence the nature and practice of the formation of the cup is of vital importance to the art of deep drawing of sheet metal.

This art has long been troubled by a characteristic of sheet metal, particularly alloys of aluminum, known as "earing" which manifests itself as a scalloped appearance around the top edge of the formed cup. The scallops, or ears, are formed during the deep drawing step in the fabrication of the cup, and represent an almost universally undesirable feature of the article, whether it be finally shaped or intended for further processing or manufacturing. The result is that the ears must be eliminated in order to present a smooth or flat upper lip on the cup. This of course necessitates further machining in the form of grinding or cutting, followed by additional finishing in some situations, with an attendant increase in production costs and higher costs resulting from increased material waste. It is evident, therefore, that the reduction or elimination of earing in deep drawing of sheet metal represents a major contribution to this art.

Generally, within the practice of this invention, a relationship between prior hot rolling temperature and final earing properties in penultimate gage and temperature has been established. It has been found that hot rolling of high purity aluminum sheet in the temperature range of 450°–950° F. produces a U-shaped curve of earing percent versus hot rolling temperature with minimum earing occurring at the center of the range and increasingly high 45° earing at both ends of the range. Alloying additions to aluminum shift the curve such that minimum earing occurs at temperatures slightly above or below the center of the range. Thus, minimum earing occurs in material hot rolled at intermediate temperatures of 650°–850° F., depending on the particular aluminum base alloy system, as seen in more detail hereinafter.

With this general description in mind, it is a principal object of this invention to improve the deep drawing characterstics of aluminum alloy sheet metal.

It is a more particular object of the invention to substantially reduce or eliminate the earing manifestation of deep drawing of aluminum alloy sheet metals.

It is a further object of the invention to provide a method of fabricating cup shaped articles from aluminum alloy sheet metal in which the characteristic scalloped or eared appearance thereof is substantially reduced or eliminated.

It is still another object of the present invention to provide an article of aluminum sheet metal in which earing in subsequent deep drawing fabrication of the article is substantially reduced or eliminated.

These and other objects and advantages of the invention will become more apparent from the following detailed description thereof when considered in conjunction with the accompanying drawings in which:

FIGURE 2 is a flow chart illustrating the fabrication schedule for hot rolling and annealing of the specimens used in the examples of the practice of the invention;

FIGURES 7 through 10 are macrostructures of samples of each of the alloys considered to show grain size and configuration at various stages in the fabrication process.

Figure 1:
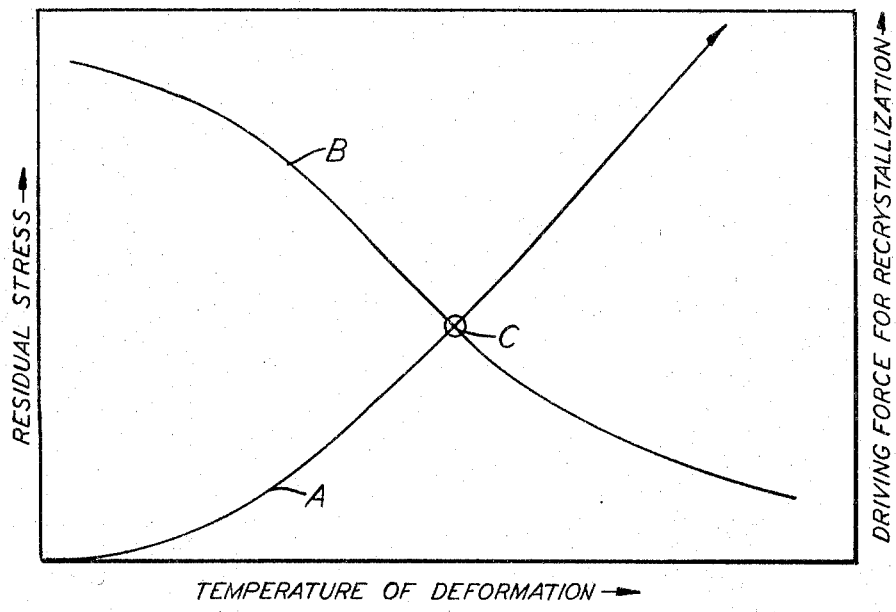
FIGURE 1 is a graphic representation of the relationship between residual cold work and driving force for recrystallization.

It has been found that low or non-earing sheet metal can be achieved by employing a preparation process involving a treatment in which initial hot rolling of the as cast and homogenized ingot is carried out at a critical temperature, or within narrow limits thereof, at which there is an instantaneous recrystallization of the metal which achieves a fine grain size coupled with a high probability of orientation randomness. These properties are essential in obtaining low or non-earing sheet. Thus, the broader aspects of the invention contemplate the provision of a mass of an aluminum alloy, heating the mass to a temperature at which the residual stress from deformation upon subsequent hot rolling and thermal driving force for recrystallization are at an energetic balance, which temperature is within the range of 650° F. to 850° F., and rolling the mass to sheet at this temperature.

To facilitate an understanding of the process of this invention, it becomes necessary to examine the causative aspects of the problem of earing. Generally speaking, earing in aluminum is the manifestation of property anisotropy caused by crystallographic preferredness or by granular texturing within sheet or strip materials. More particularly, earing results from the deep drawing of metal sheet or strip in which there exists a preferential directionality of physical properties as distinguished from random directionality. The directionality or preferred orientation of these physical properties is a function either of atom slippage along slip lines within the normal texture of the metal grains, or of mechanical preferredness of the grain structure of the metal resulting from grain rotation upon pressure rolling. The effect of this property anisotropy is that the physical properties of the metal are not the same in all directions, but vary in accordance with the directionality of the crystallographic structure or the grain texturing. The physical manifestation of this property effect is that upon subsequent cold work by deep drawing, the metal cannot elongate or stretch as well in one direction as it can in another, with the result that ears appear around the upper rim of the cup in those directions where the metal stretches more freely, and depressions appear intermediate the ears where the metal exhibits a greater resistance to stretching. This phenomenon occurs with the ears oriented either parallel and perpendicular to the direction of rolling of the metal, referred to as 90° earing, or with the ears oriented intermediate the quadrants defined by the rolling direction, referred to as 45° earing. It is, of course, these ears which make the product commercially uneconomic by necessitating additional processing with concomitant higher material and labor costs to provide an acceptable product.

The factors which effect earing within any particular alloy are the composition, the casting practice, preheating practice, hot rolling temperature and technique, slab and strip interannealing, cold rolling reduction and final annealing practices. Although all of the above mentioned fabrication variables contribute to mechanical directionality, they are for the most part of second order importance to the single effect produced by hot rolling. It has now been determined that in aluminum alloys, control of the primary hot working step, specifically the hot rolling deformation temperature, is of singular importance in determining earing behavior.

The effects of hot rolling and the resulting mechanical directionality of the alloys has been determined to be a function of the temperature at which deformation occurs which is held constant at various levels throughout the hot rolling operation. As evidenced by the examples hereinafter set forth, in all cases, even including superpurity aluminum, earing followed a particular characteristic type behavior as a function of the temperature at which the alloy was hot rolled. In general, it has been determined that hot rolling in the range of 450°–950° F. gives a U-shaped curve in which minimum earing occurs in intermediate temperatures of 650°–850° F. with increasingly strong 45° earing developed both below and above this intermediate temperature range. The presence of impurities and additions of the principal alloying elements to the high purity aluminum simply shift the basic characteristic with respect to both temperature and earing percent.

As used in the following discussion, the term "recrystallization temperature" is defined as the lower limit of temperature of hot working or the approximate minimum temperature for recrystallization of a cold worked metal within a specified time.

The exact mechanisms of the recrystallization processes active in hot working operations are complicated by the relationship between the residual work, as defined by prior deformation, in the specimen and the recrystallization temperature or the thermal energy available for the recrystallization process. In the usual static case, established on the basis of the residual stress of cold work, this relationship is of reciprocal nature such that the higher the degree of cold work, the lower will be the recrystallization temperature. This reciprocity can best be explained in terms of thermodynamic energy using an Arrhenius type expression such as:

$$\text{Rate} = Ae^{-Q/RT}$$

where A is a material constant, Q is the thermal energy or driving force for the process, R is the gas constant and T is the absolute temperature, here the recrystallization temperature. Of primary importance is the Q term.

The nature of this relationship for hot working is better understood by reference to FIG. 1 which shows a qualitative plot of this relationship as a function of temperature at which deformation is occurring. In this plot, thermal energy for recrystallization, or thermal driving force (Q), follows the typical exponential curve A of negative sign with temperature while the plot of residual stress B decreases typically for a constant amount of deformation as a function of increasing temperature. This residual stress curve is typical of yield strength vs. temperature curves for various aluminum alloys in the cold rolled condition as a function of annealing temperature. On the basis of the two interacting curves of opposite nature illustrated in FIG. 1, it is apparent that at rolling temperatures below the intersection C of the two curves, the material behaves similar to normal cold worked material followed by standard stress relief anneal, resulting in a strong tendency toward earing in the 45° direction.

At the intersection of the two curves, an exact energetic balance between the retained supply of energy from the prior deformation process for recrystallization, or residual stress, and the thermal driving for recrystallization, create conditions for an instantaneous or "autogenous" type of true recrystallization at the point C. The term "autogenous" as used herein is new and describes specifically a condition of inherent self generating recrystallization, i.e., recrystallization forced to occur simultaneously with deformation, instantaneously and over a very short order approaching sub-grain size. The nuclei for this autogenous recrystallization is believed to exist in the sub-grain structure which has been found to be generated in these alloys during the deformation process.

The net result of autogenous recrystallization is a fine grain size with a high probability of orientation randomness thus resulting in a minimum tendency toward earing. This randomness of orientation can be expected because the recrystallization is dynamic and occurs simultaneously while undergoing bi-axial strain in the rolling operation. The conditions thus created are entirely different from those experienced during either very high temperature rolling or cold rolling and subsequent annealing.

When the material is rolled above the autogenous recrystallization temperature, deformation mechanisms active during hot rolling cause alignment or texturing of the grain structure along the deformation slip systems. These in aluminum are the same or very nearly the same as the slip systems active during cold working. At rolling temperatures above the critical temperature (C, FIG. 1), although sufficient thermal energy is available for normal recrystallization, insufficient residual stress (B, FIG. 1) is available. The resulting structure, then, would likewise be of high preferredness and very similar to the texture type generated during cold working.

Thus it is seen that the autogenous recrystallization temperature reflects a sharp transition in recrystallization mode which becomes most apparent in both property and structure analyses.

Another manifestation of autogenous recrystallization is the genetic relationship which exists between the hot rolled material and the subsequent cold rolled and annealed material. By tracing the earing behavior of various alloy systems through three generations of approximately 50% cold rolling with interannealing, it has been determined that the mechanical directionality generated during hot rolling reduction persists, but in continually decreasing intensity through at least the three generations of cold work and annealing. However, the primary earing behavior established during hot rolling overrides the tendency of subsequent cold working and annealing to decrease earing intensity. Accordingly, a high degree of earing in the hot rolled strip can be partly suppressed by subsequent cold rolling and annealing, but, in general, this approach is much less effective than starting with a low degree of earing from the hot rolled strip by hot reduction at or near the autogeneous recrystallization temperature.

A similar behavior to that of earing exists in grain size, which undergoes a minima at some intermediate hot rolling temperature and which carries along through subsequent cold rolling and annealing cycles.

A more thorough understanding of the present invention may be attained by reference to the following specific examples of the practice of the invention, taken with the graphic representations of experimental results illustrated in FIGURES 3 through 6. The investigation included typical compositions of 1100, 3003 and 5005 alloys including superpurity aluminum (99.99%) as a standard of comparison.

*Examples*

The materials used were laboratory D.C. cast standard 1100, 3003 and 5005 alloys, together with superpurity aluminum as a comparison standard to indicate the general effects of the alloying elements. The specific compositions of each of the alloys were as listed in the following table:

ALLOY COMPOSITIONS

| Alloy | Si | Fe | Cu | Mg | Mn | Zn |
|---|---|---|---|---|---|---|
| Super-Purity | <0.001 | 0.0021 | <0.001 | | | |
| 1100 | 0.24 | 0.61 | 0.14 | | 0.018 | 0.04 |
| 3003 | 0 19 | 0.48 | 0.14 | 0.22 | 1.33 | |
| 5005 | 0.19 | 0.52 | 0.05 | 0.80 | 0.035 | |

The alloys in all cases were prepared by the laboratory D.C. casting process with a drop rate of 5 inches per minute using a 2″ thick x 4″ wide x 1½″ deep mold to produce one 30″ long ingot for each of the four experimental alloys. Melting of the alloys was carried out in an induction furnace. After alloying, the melt was degassed by fluxing with chlorine gas until a low gas level of one bubble in vacuum testing was obtained. The average pouring temperature was 1300° F.

Prior to hot rolling, the superpurity, 1100 and 3003 alloys were each homogenized at 1050° F. for 24 hours, while the 5005 alloy was homogenized at 1150° F. for 24 hours.

All fabrication was done using a laboratory 12″ x 12″ rolling mill in accordance with the fabrication schedule for hot rolling illustrated in the table of FIG. 2. This schedule was utilized to delineat the single effect of hot rolling temperature, within the range of 450° F. to 950° F., on the subsequent directionality in cold rolled and annealed specimens. It will be observed from this table that a specimen of each of the alloys tested was subjected to identical fabrication at each of the initial hot rolling temperatures indicated by H.R. in increments of 100° F. from 450° F. to 950° F. A specimen was hot rolled at each of the indicated temperatures, interannealed at 950° F. for 2 hours, cold rolled 50% and interannealed at 650° F. for 2 hours, further cold rolled 55% and again interannealed at 650° F. for 2 hours, and finally cold rolled 50% and finally interannealed at 650° F. for 2 hours. Thus, any directionality introduced during the breakdown and hot rolling was traced through three cycles of approximately 50% cold rolling interspersed by full annealing at 650° F. for 2 hours.

FIGURES 3 through 6 are plots of the measured earing results for the as-hot rolled material in both the as-rolled and annealed condition plotted as a function of prior hot rolling breakdown temperature. The figures are plotted in the normal manner using percent earing as the ordinate with O earing as the origin and increasing 45° component going vertically upward and increasing 90° component going vertically downward. O earing would be reflected by a crossing of the abscissa. The shaded area reflects the variation in results obtained by four identical deep drawing cups.

Figure 3:
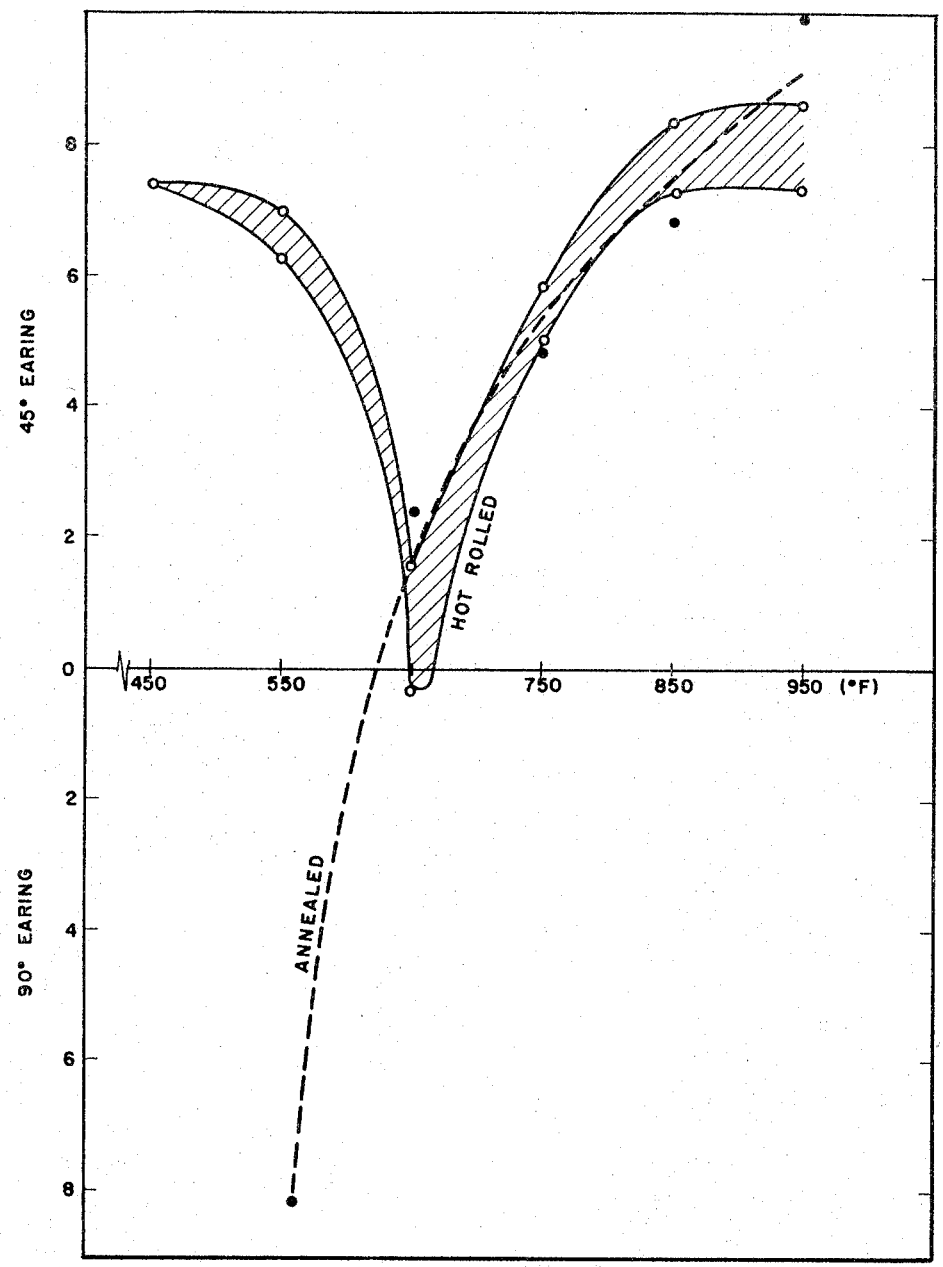
FIGURES 3 through 6 are plots of earing behavior as a function of prior hot rolling temperature and subsequent 950° F., 2-hour anneal for superpurity aluminum, alloy 1100, alloy 3003 and alloy 5005, respectively.

As can be seen from FIGURE 3, the superpurity aluminum, when hot rolled at temperatures up to 650° F., exhibits a strong 45° earing behavior typical of a type resulting from cold rolling. This same material, when subsequently annealed at high temperature (950° F.) after deformation below the autogenous recrystallization temperature, resulted in classical recrystallization to the 90° earing direction. At the autogenous recrystallization temperature, the earing percent intensity is at a minimum; subsequent annealing at 950° F. causes little or no mechanical directionality modification in the alloy. When rolled above 650° F., the alloy exhibited increasingly high 45° earing behavior; subsequent annealing at 950° F. for 2 hours did not modify the type or degree of earing.

Figure 4:
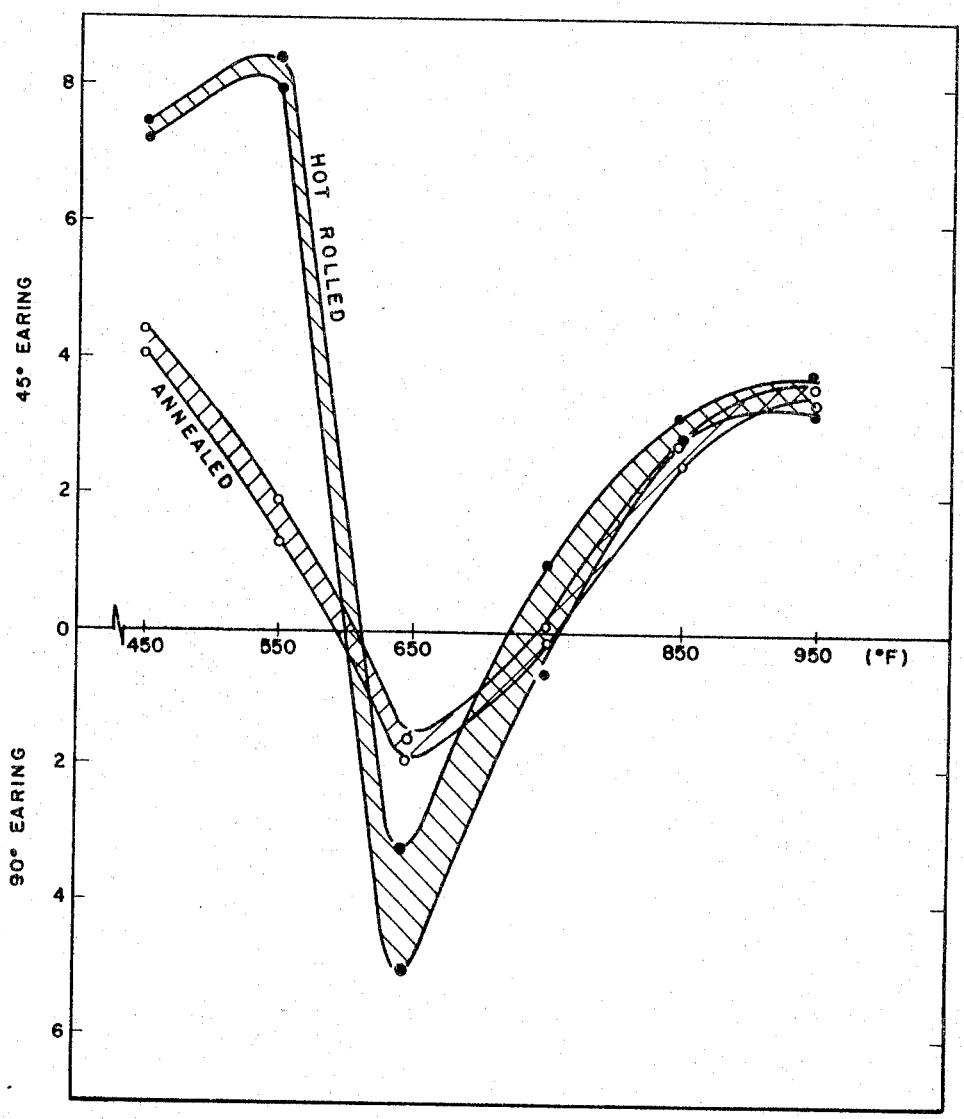
Figure 5:
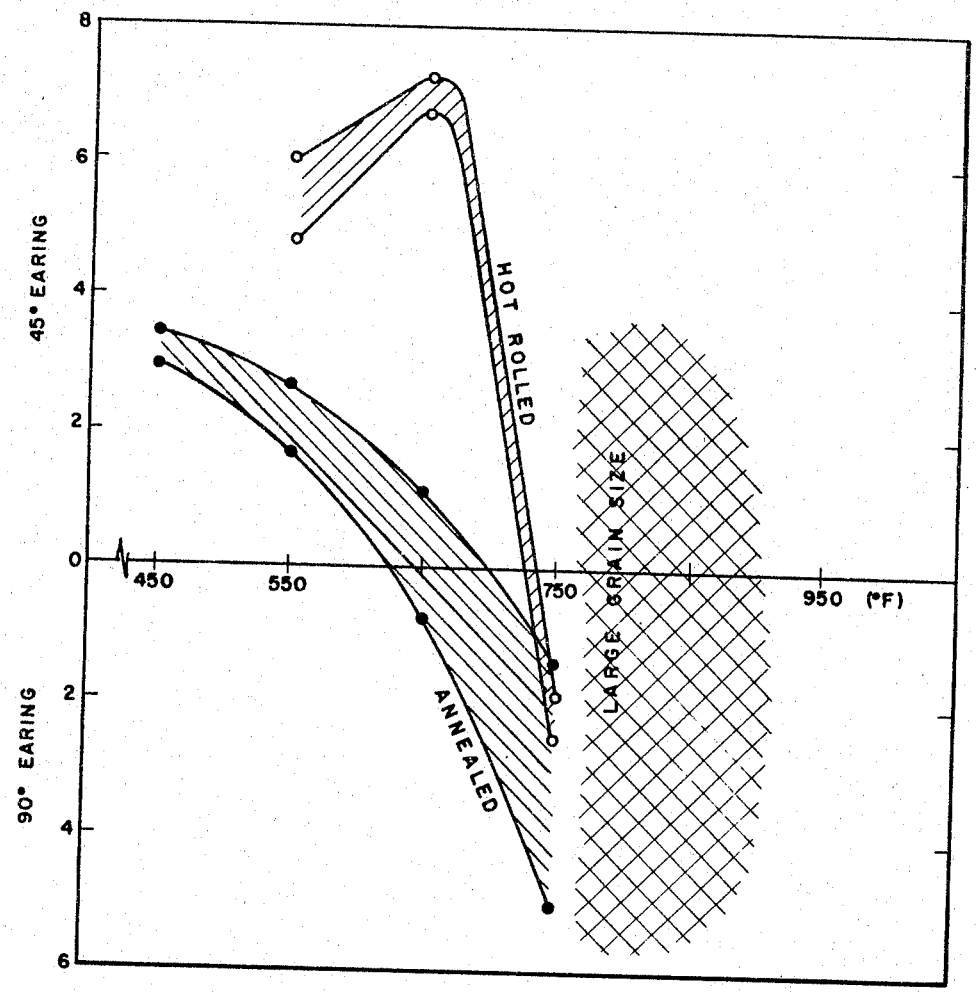
Figure 6:
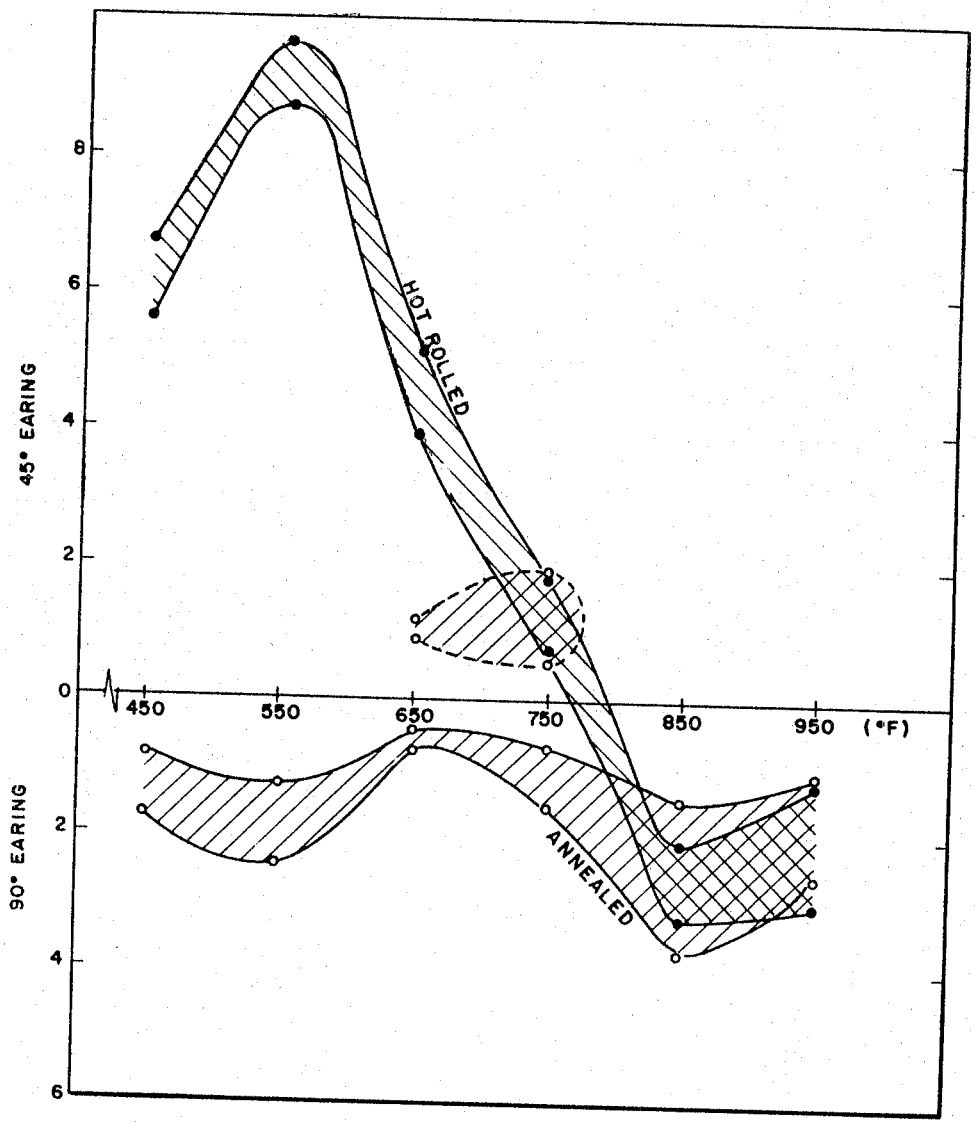

FIGURES 4, 5 and 6 illustrate parallel behavior for the three commercial purity alloys which are used extensively in deep drawing applications by showing earing percent versus hot rolling temperature of deformation for each of the alloys studied. In all of the alloy systems studied, a characteristic earing behavior was observed as a direct function of hot rolling temperature; specifically the earing height, as seen in FIGURES 3 through 6, of the as-hot rolled sheet shows a well defined minimum in materials hot rolled in the intermediate temperature range between 650° and 850° F. depending on the particular alloys.

It will be apparent from the foregoing description that there has been provided a method of fabricating low or non-earing aluminum sheet metal and an article of the sheet produced thereby which is believed to provide a solution to the foregoing problems and achieve the aforementioned objects. It is to be understood that the invention is not limited to the specific examples described herein which are deemed to be merely illustrative of the best modes of carrying out the invention, but rather is intended to encompass all such modifications as are within the spirit and scope of the invention as set forth in the appended claims.

What I claim and desire to secure by Letters Patent is:
1. A method of fabricating low or non-earing aluminum sheet metal comprising the steps of:
 (A) providing a mass of an aluminum base alloy,
 (B) heating said mass to the autogenous recrystallization temperature for said aluminum base alloy in which residual stress from deformation upon subsequent hot rolling and thermal driving force for recrystallization are at an energetic balance, said temperature being within the range of 650° F. to 850° F. to provide a fine grain size with high probability of grain structure orientation randomness in said alloy, and
 (C) rolling said mass to sheet at a temperature within the range of 650° F. to 850° F.
2. The method of claim 4 wherein said temperature is within the range of 700° to 750° F.
3. The method of claim 4 wherein said temperature is within the range of 750° to 800° F.
4. The aluminum sheet produced in accordance with the process of claim 4.

References Cited by the Examiner
UNITED STATES PATENTS

| | | | |
|---|---|---|---|
| 2,249,349 | 7/1941 | Deutsch | 148—32 X |
| 2,262,696 | 11/1941 | Nock et al. | 148—11.5 |
| 3,219,491 | 11/1965 | Anderson et al. | 148—11.5 |

FOREIGN PATENTS 780,570  8/1957  Great Britain.

OTHER REFERENCES

Alloy Digest, Engineering Alloys Digest, Inc., New Jersey, Filing Code A1–31 and A1–44.

HYLAND BIZOT, *Primary Examiner.*

DAVID L. RECK, *Examiner.*

C. N. LOVELL, *Assistant Examiner.*

UNITED STATES PATENT OFFICE
CERTIFICATE OF CORRECTION

Patent No. 3,318,738          May 9, 1967

Joseph Winter

It is hereby certified that error appears in the above numbered patent requiring correction and that the said Letters Patent should read as corrected below.

Column 5, line 27, for "delineat" read -- delineate --; column 6, lines 43, 45, and 48, for the claim reference numeral "4", each occurrence, read -- 1 --.

Signed and sealed this 28th day of November 1967.

(SEAL)

Attest:

Edward M. Fletcher, Jr.
Attesting Officer

EDWARD J. BRENNER
Commissioner of Patents